United States Patent Office 3,479,217
Patented Nov. 18, 1969

3,479,217
COPPER-COATED GLASS ARTICLE
Louis Spanoudis, Toledo, Ohio, assignor to Owens-Illinois, Inc., a corporation of Ohio
No Drawing. Filed May 31, 1967, Ser. No. 642,315
Int. Cl. C03c 17/06, 3/04
U.S. Cl. 117—227                                    6 Claims

ABSTRACT OF THE DISCLOSURE

A composition of matter consisting of a vitreous, alkali-aluminosilicate glass with an expansion of 70 to $80 \times 10^{-7}$ cm./cm./° C. and having fused into the outer surface network and extending over extensive areas of said glass surface a conductive metallic copper layer.

BACKGROUND OF THE INVENTION

The present invention relates to novel glass compositions, and more particularly the instant invention pertains to novel glass compositions having a surface conductive coating. Specifically, the invention is concerned with alkali-aluminosilicate glasses having fused into the surface network and carrying on their exterior surface an electrically-conductive reduced copper layer.

It has been the practice prior to the present unobvious invention, to effect coatings on and in glass surfaces by complicated fabrication techniques. One method, generally employed by the prior art, for coating glasses involved the steps of heating an acid extraction of the glass to produce an extremely rich silica glass surface and then coating said glass surface. Another method involved the introduction of silver ion into specific glasses at precise ion introduction and reduction temperatures to give the desired mirror-like reflecting glass. Other techniques employed in the prior art involved vapor deposition, evaporation and the like with their accompanying disadvantages of seemingly non-adherent, easily scratched layers. From the above discussion it can easily be ascertained by those knowledged in the instant art that the prior art manufacturing methods and compositions are individualistic in nature and are therefore not universally suited for application to other immediate and seemingly like endeavors. Also, from the discussion supra, it is self-evident that fabrication problems intimately associated with the prior art are very serious as it may be necessary to refabricate the desired article of science or commerce only with the accompanying economic loss.

It will be appreciated by those skilled in the coating art that if a novel composition which is both internally and externally receptive to metallic conductive films is made available to the instant art, said unique composition would have a definite use and would represent a substantial contribution to the instant art. Likewise, it will be appreciated by those versed in the present art that if a method is provided to produce a uniform, low electrical resistant, metallic conductive film which penetrates and extends over extensive areas of a specific film receptive glass, said method would satisfactorily increase the usefulness of the glass and simultaneously make available the fruits of the invention to science and commerce.

Accordingly, it is a purpose of the present invention to provide a novel glass composition.

Another purpose of the subject invention is to provide a glass composition that is receptive to uniform metallic films.

It is still a further purpose of the present invention to provide a method for producing conductive strata on glass bodies.

It is yet a further purpose of the present invention to provide a unique method for producing both a conductive strata and a conductive layer on a glass body.

Still a further purpose of the present invention is to provide a method of incorporating within a formed glass shape a conductive layer of copper metal, or an alloy of copper.

Yet another purpose of the present invention is to provide to the art a glass consisting essentially of silicon dioxide, aluminum oxide and alkali oxides.

Yet another purpose of the present invention is to contribute to the subject art a novel glass composition having on its outer surface a conductive metallic copper film.

Other objects, features and advantages of the instant invention will become self evident to those knowledged in the present art from the following detailed description of the disclosure and the claimed invention.

SUMMARY OF THE INVENTION

In attaining the above and other contributions of the instant invention, there is provided novel glass compositions consisting essentially of $SiO_2$, $Al_2O_3$, $Na_2O$ having intimately imbedded in its outer most porous, network glass structure and extending over its exposed surface a reduced, conductive, metallic copper film. The copper film is conventionally applied to the above described novel alkali-aluminosilicate glass by the steps of first treating the glass substrate in a molten bath containing a substantial portion of mono-valent copper ion, and then subjecting the copper treated glass to a reduction process to effect the low electrical resistive strata and film on the glass body.

Also, in the attainment of the purposes of this invention, it has been unexpectedly found that the subject novel glass suitable for electro-conductive coating can be obtained by employing glass compositions containing silicon dioxide ($SiO_2$), aluminum oxide ($Al_2O_3$), sodium oxide ($Na_2O$), lithium oxide ($Li_2O$), potassium oxide ($K_2O$) and magnesium oxide (MgO), in an intimate inventive combination of these components to produce glass compositions suitable for the purpose of the disclosed invention.

The subject glasses are generally based on the compositional range of about 50 to 80 weight percent $SiO_2$, 7.5 to 30 weight percent $Al_2O_3$ and 5 to 20 weight percent $Na_2O$. The glass compositions of the present invention can also include 0 to 15 weight percent $Li_2O$, 0 to 20 weight percent $K_2O$, 0 to 1 weight percent MgO and 0 to 0.5 weight percent $Sb_2O_3$. Exemplary of glasses coming within the immediate compositional range are a glass characterized by the molecular formula $Na_2O \cdot Al_2O_3 \cdot SiO_2$ with a ratio of 1:0.75:4.25; a glass consisting of 60 to 70 weight percent $SiO_2$, 18 to 22 weight percent $Al_2O_3$ and 12 to 16 weight percent $Na_2O$; and a glass consisting of 60 to 70 weight percent $SiO_2$, 18 to 22 weight percent $Al_2O_3$, 8 to 12 weight percent $Na_2O$, 0.1 to 1 weight percent MgO, 3 to 5 weight percent $Li_2O$ and 0.1 to 0.5 weight percent $Sb_2O_3$, and the like glass compositions. The novel glasses of the invention also have a linear thermal coefficient of expansion of about 70 to $80 \times 10^{-7}$/° C. (0–300° C.). Usually, the range is about 75 to $80 \times 10^{-7}$/° C. (0–300° C.).

In preparing the novel glasses of the disclosed compositional range the batch ingredients are intimately mixed by hand or in a commercially available blender and heated to such temperatures so that all of the glass forming substances are present in the liquid state, thereby enabling the formation of a vitreous glass from a homogenous melt.

Generally, the batch ingredients were mixed well by hand and melting was done in a conventional 90% platinum 10% rhodium crucible heated in an electric furnace at about 2900 to 3000° F., for about 2 to 5 hours in an air atmosphere. The batch ingredients were continuously stirred during the melting and heating procedure.

The batch materials employed for the preparing of the glasses of the invention, were of a high purity and were selected from the following commercially available materials: $SiO_2$, Ottawa sand or Kona Quintus Quartz; $Al_2O_3$, Alcoa A–14 alumina; $Li_2O$, lithium carbonate; MgO, magnesium carbonate; and $Na_2O$, soda ash. Of course, the glasses of the present invention can be in the form of functionally equivalent oxides, carbonates, fluorides, silicates, or any other form which does not disturb or adversely affect the subject glass composition.

The process for producing a conductive layer of metallic copper on the exterior of the above-described glass compositions generally involves the multiple steps of immersing the glass in a molten salt bath for a time sufficient to diffuse the molten ions into the glass and extend over the exterior surface of the glass.

The temperature for diffusing the ions into the glass is usually between 800° F. and 1100° F.; the lower temperature is conventionally dictated by the melting point of the ion salt and the upper temperature is generally controlled by the viscosity of the glass. Generally, the time required for the desired degree of diffusion is from about an hour to 64 hours. On cooling, the excess deposited metallic oxide is mineral acid removed and the glass is then placed in a reducing atmosphere at about 800° F. to 1100° F. to produce a metallic conductive film. The reduction process is usually completed in 10 to 15 minutes and the reducing atmosphere can be hydrogen or mixtures of hydrogen and nitrogen, usually 75% $H_2$ and 25% $N_2$ or 10 to 15% $H_2$ and the balance $N_2$.

The following examples are representative of embodiments of glass compositions of the present invention and these examples are not to be construed as limiting as other obvious embodiments will be readily apparent to those versed in the art.

Example 1

An alkali-aluminosilicate glass having a theoretical analysis of 64.4 weight percent $SiO_2$, 21.6 weight percent $Al_2O_3$, 9.1 weight percent $Na_2O$, 0.8 weight percent MgO, 3.7 weight percent $Li_2O$ and 0.4 weight percent $Sb_2O_3$ was prepared by intimately blending 8795 grams of Ottawa sand, 2004 grams of soda ash, 2943 grams of A–14 alumina, 1253 grams of lithium carbonate, 193 grams of niter, 226 grams of magnesium carbonate and 54 grams of antimony oxide in a commercial blender until a homogenous blend was obtained. The substantially homogenous mixture was melted in an electric furnace. The melting and fining procedures were conducted by heating at 2900° F., for 27½ hours in an air atmosphere. Thereafter, glass rod was drawn from the molten glass at about 2020 to 2100° F. The glass produced in this run had a thermal coefficient of expansion of $78 \times 10^{-7}/$° C. (0–300° C.).

Example 2

A copper conductive layer intimately fused into and extending, over extensive surface areas of a piece of glass tubing prepared according to the procedure of Example 1 and treated as follows: a glass composition consisting essentially of 64.74 weight percent $SiO_2$, 21.67 weight percent $Al_2O_3$, 9.12 weight percent $Na_2O$, 3.68 weight percent $Li_2O$ and 0.79 weight percent MgO in the form of tubing with outside diameter of 11/32 inch and a 3/64 inch wall thickness was treated by immersing the tubing in a sodium nitrate bath at 750° F. for 7 hours. Then, the tubing was immersed in a copper chloride ($Cu_2O$) bath at 950° F. for 16 hours. The sample tubing was next cleaned of adhered salts by washing with HCl and rinsing the washed tubing with distilled water. The washed tubing was then placed in a reducing atmosphere of hydrogen at 1000° F. for 15 minutes. The depth of the metallic layer was about 0.020 inch and a 1½ inch section of the tubing had a resistance of about one ohm.

Example 3

A glass rod, 0.200 inch in diameter, and consisting essentially of $1Na_2O$-$0.75Al_2O_3$-$4.25SiO_2$ was immersed in a molten bath of cuprous chloride at 1050° F. for two hours. Next, the rod was cooled to room temperature and adherent cuprous chloride salts were removed by washing with concentrated hydrochloric acid. Then, the rod was placed in a hydrogen atmosphere for 15 minutes at 1100° F. to produce a metallic copper layer of about 0.020 inch thick which layer extended over the exposed surface of the rod. A 1⅛ inch long piece of rod exhibited a resistance of 0.7 ohm.

Example 4

The sample rod, reagents and procedures employed in the present example were identical to the conditions set forth in Example 3, except that the treatment in cuprous chloride was at 900° F. for 64 hours. The depth of the reduced copper layer was about 0.060 inch for this run.

Example 5

A piece of glass tubing formed from a composition consisting essentially of 64.84 weight percent $SiO_2$, 19.42 weight percent $Al_2O_3$ and 15.75 weight percent $Na_2O$ and wherein the glass had an annealing point of 1145° F., a log 4 viscosity at 2500° F. and a liquidus of <1800° F., was immersed in a molten cuprous chloride bath at 1050° F. for two hours. After cooling to room temperature the tubing was washed with HCl and rinsed with distilled $H_2O$. Next, the tubing was placed in a 100% $H_2$ atmosphere for 15 minutes at 1100° F. to produce a metallic layer with low resistivity.

The results obtained for the above described glass appear to be unobvious and are seemingly applicable to alkali-aluminosilicate and alkali-zirconia silicate glasses, as the results could not be seemingly duplicated according to the mode and manner of the present invention on other glasses such as borosilicate, soda lime and alkali magnesia silicate. The substitution of ions into the novel aluminosilicate glasses at a temperature high enough to accept ions appears to be limited to copper with an ionic diameter of 0.96 angstrom which would not adversely effect the expansion characteristics of the subject glass in seemingly distinction to other ions, for example, silver with an ionic diameter of 1.26 angstroms which would apparently cause an increase in the expansion of the glass.

The resistance of the above glasses was usually measured with a standard, commercially available ohm meter. Silver contact points were usually applied to the ends of the glass sample, and after the reduction step to assist and insure resistance measurements. The silver contact points were easily applied by coating a small area with a commercially available silver paint. The resistance is reported herein as ohms.

The novel glass of the present invention with an electroconductive metallic surface intimately fused thereto can be used in the fields of commerce and science for many endeavors. For example, the applications include printed circuits, capacitors by reducing two surfaces of a thin copper layered sheet, and the like.

While the illustrative embodiments of the invention have been described with particularity, it will be understood that various modifications will be apparent and can readily be made by those skilled in the art without departing from the scope and spirit of the invention.

I claim:
1. A composite article of manufacture wherein said article consists essentially of a vitreous, alkali-aluminosilicate glass of 50 to 80 weight percent $SiO_2$, 7.5 to 30 weight percent $Al_2O_3$, 5 to 20 weight percent $Na_2O$, 0 to 15 weight percent $Li_2O$, 0 to 20 weight percent $K_2O$, 0 to

1 weight percent $Sb_2O_3$ and 0 to 1 weight percent MgO, and wherein said glass has imbedded in its outermost glass network and extending over its exterior surface an electrically conductive, metallic copper film.

2. A composite article according to claim 1 wherein said glass has a linear thermal coefficient of expansion of 70 to $80 \times 10^{-7}/°$ C. (0–300° C.).

3. A composite article according to claim 1 wherein the glass consists essentially of 60 to 70 weight percent $SiO_2$, 18 to 22 weight percent $Al_2O_3$ and 12 to 16 weight percent $Na_2O$.

4. A composite article according to claim 1 wherein said glass consists essentially of 60 to 70 weight percent $SiO_2$, 18 to 22 weight percent $Al_2O_3$, 8 to 12 weight percent $Na_2O$, 0.1 to 1 weight percent MgO, 3 to 5 weight percent $Li_2O$ and 0.1 to 0.5 weight percent $Sb_2O_3$.

5. A composite article according to claim 1 wherein said film is a reduced copper.

6. A process for producing a conductive reduced metallic film on an alkali-aluminosilicate glass wherein said process consists of the steps of immersing the glass in a molten copper salt bath at temperatures of 800° F. to 1100° F., for about 1 to 64 hours, cooling the coated glass to room temperature, washing the cooled, coated glass with a mineral acid and then placing the coated glass in a reducing atmosphere at 800° F. to 1100° F. to produce said conductive film.

References Cited

UNITED STATES PATENTS 2,662,036  12/1953  Levi _____ 117—124

WILLIAM L. JARVIS, Primary Examiner

U.S. Cl. X.R.

65—60; 117—229, 124